Feb. 7, 1928.

H. M. DENYES 1,658,554

VEHICLE STEERING AND CONTROLLING MECHANISM

Filed March 16, 1923  2 Sheets-Sheet 1

Inventor
Harry M. Denyes
By his Attorneys
Blackmore, Spencer & Flint

Feb. 7, 1928.
H. M. DENYES
1,658,554
VEHICLE STEERING AND CONTROLLING MECHANISM
Filed March 16, 1923 2 Sheets-Sheet 2
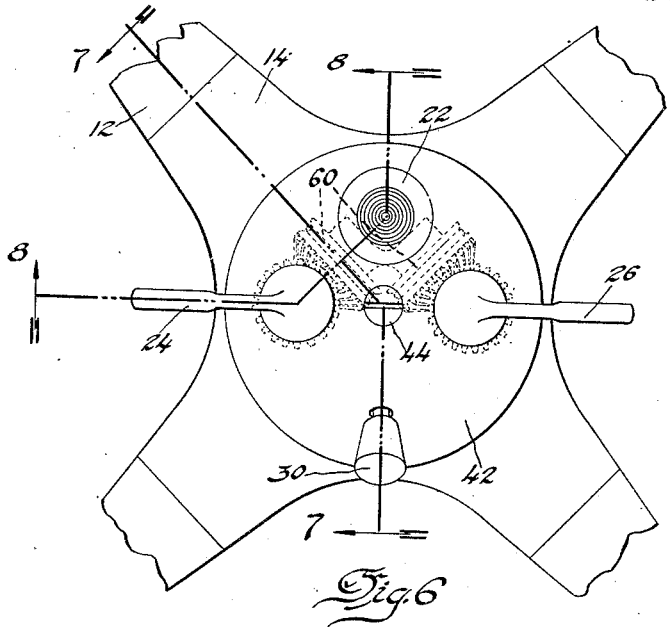
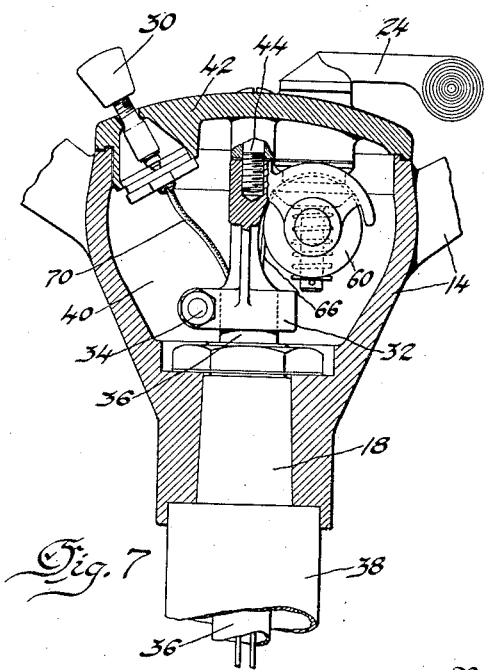
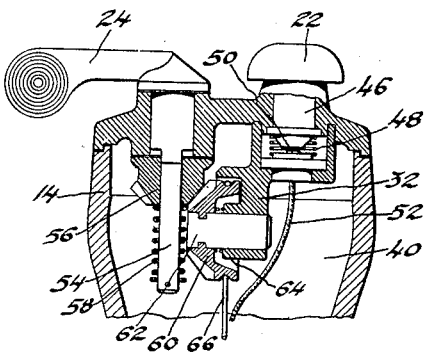
Inventor
Harry M. Denyes
By his Attorneys
Blackmore, Spencer & Flick Patented Feb. 7, 1928.

1,658,554

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

VEHICLE STEERING AND CONTROLLING MECHANISM.

Application filed March 16, 1923. Serial No. 625,641.

This invention relates to vehicles and is illustrated as embodied in the steering and controlling mechanism of an automobile.

One important feature of the invention relates to an arrangement for stationarily supporting various of the devices for controlling the vehicle immediately above and within the circumference of the steering wheel. In one such arrangement, which is desirable from a manufacturing point of view, these devices are supported by a tube arranged inside of the steering tube which is operated by the steering wheel. In the embodiment of the invention illustrated in the accompanying drawings, the control devices are supported by a bracket clamped to the top of the supporting tube and are protected by a cover plate, which is also supported by the tube, and which cooperates with a portion of the steering wheel which is so formed and arranged that it constitutes in effect a casing for the control devices. These control devices are shown as being throttle and spark levers, a horn button, and a mechanical or electrical dimmer switch.

Another feature of the invention from this point of view relates to controlling the vehicle by means of flexible connectors such as wires passing through the above described tube and arranged to be tensioned by pulleys or equivalent operating members radiating from the top of the tube; i. e., the pulleys are angularly spaced about the top of the tube in radial planes so that the flexible connectors pass over the inner sides of the pulleys directly into the tube with a minimum of bending.

Of especial utility in an arrangement such as described above, although not necessarily so limited( is an arrangement of a lamp such as a headlight, or a pair of such lamps, comprising tiltable members operated by novel connections which most conveniently include one of the above described control devices supported just above the steering wheel. In the arrangement illustrated, there is a casing and lens for each lamp and a reflector within the casing and behind the lamps which is tiltable about a transverse horizontal axis to deflect a major portion of the light downwardly so that the lamp is effectively dimmed so far as regards the driver of an approaching vehicle. Preferably the tilting is done by means of a pair of flexible connectors joined by a novel connection to a single control connector passing through the steering tube and operated by the above-mentioned mechanical dimmer switch.

Other features of the invention, including various novel combinations and desirable particular constructions of parts, will be apparent from the following description of two illustrative embodiments of the invention shown in the accompanying drawings, in which:

Figure 6 is a top plan view corresponding to Figure 2 but illustrating a modification of the invention in which an electrical dimmer switch is used;

Figure 7 is a section on the line 7—7 of Figure 6 showing the dimmer switch and the pulley of the spark control device; and Figure 8 is a section on the line 8—8 of Figure 6 showing the spark control device and the horn button.

Figure 1:
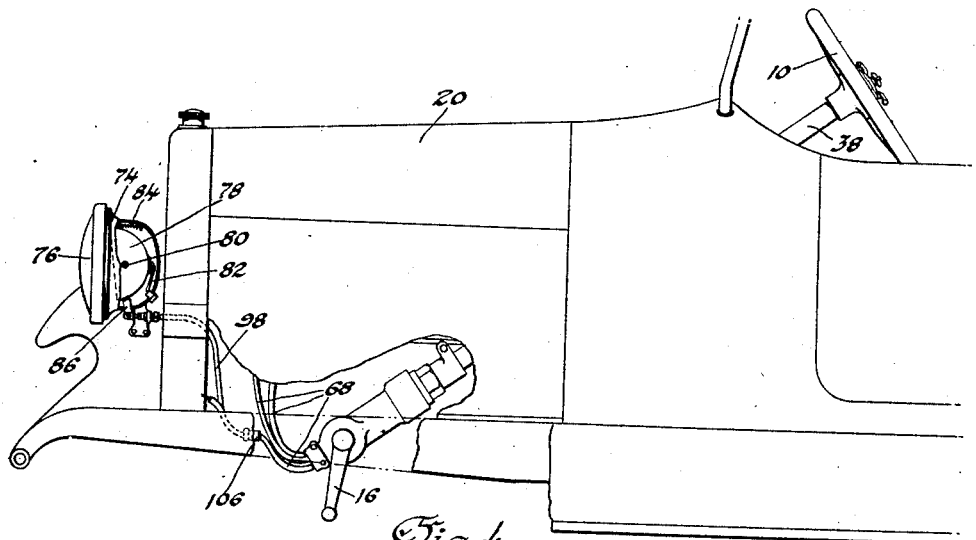
Figure 1 is a side elevation, partly broken away, of so much of an automobile as it is necessary to show to illustrate the invention.
Figure 2:
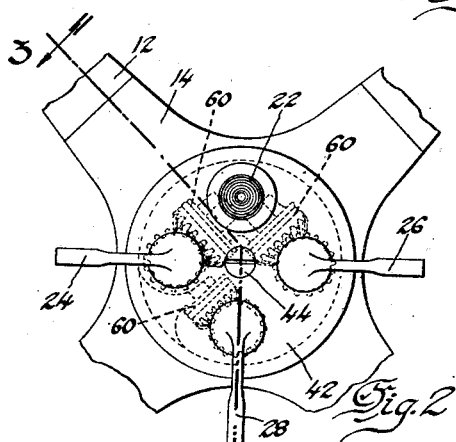
Figure 2 is a top plan view of the central part of the steering wheel.
Figure 3:
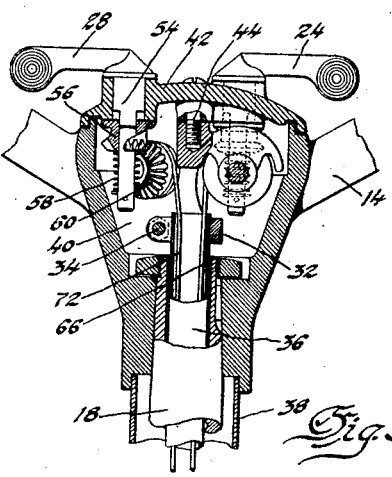
Figure 3 is a section on the line 3—3 of Figure 2 showing the lamp tilting dimmer switch and the operating pulley of the spark control device.
Figure 4:
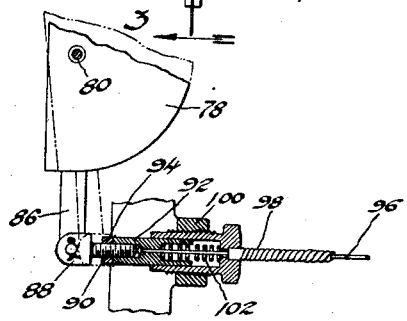
Figure 4 is a fragmentary view showing part of the tiltable lamp connections from the same point of view as in Figure 1 except that they are on an enlarged scale and are partly broken away.

In either modification of the invention the various control devices are stationarily supported above and within the circumference of a steering wheel 10 shown as having spokes 12 supported in sockets in short radial arms formed in a central metal hub portion 14, the steering wheel 10 being arranged to operate a steering arm 16 by angular movement of a steering tube 18 to which it is keyed, in such a manner as to control the dirigible front wheels of the automobile 20. In the following description, the control devices will be described as comprising a horn button 22, a spark advancing or retarding lever 24, a throttle control lever 26, and either a mechanical dimmer switch 28 (Figure 2) or an electrical dimmer switch 30 (Figure 6). It will be understood, however, that the invention is applicable to control devices of other kinds and that except when specifically so recited in the claims it is not my intention to limit the scope of the invention to its application to the particular control devices described.

According to an important feature of the present invention the control devices are supported, as for example by a bracket 32 having a clamp screw 34, on a stationary tube 36 co-axially arranged within the steering tube 18 and fastened at its lower end, where it projects beyond the steering tube 18, in a stationary supporting bracket of any desired form. In the particular form of steering assembly shown in the drawings there is a further stationary tube 38 outside of and protecting the steering tube 18.

I prefer to form the central hub portion 14 of steering wheel 10 with a central space 40, which may be regarded as adapting the hub 14 to serve as a casing for the above enumerated control devices. The devices are further protected by providing a cover plate 42, attached to bracket 32 by a screw 44, which cooperates with the hub portion 14 of the steering wheel to enclose the various control devices.

The spark and throttle control devices and the horn button are shown as being the same in both modifications of the invention. The horn button 22 is carried by a sliding plunger 46 supported by a coil spring 48 immediately above a contact 50, to which is connected a flexible wire or other conductor 52 passing through the stationary supporting tube 36 and connected to the horn circuit in the usual manner. Each of the spark and throttle control levers 24 and 26 is secured on the upper end of a shaft 54 to which is slidably keyed a bevel gear 56 provided with a friction surface on its top which is urged against a corresponding surface on the lower face of plate 42 by a spring 58, in such a manner that the lever 24 or 26 will be held in any position to which they are moved. Each bevel gear 56 meshes with a bevel gear formed on a pulley 60 supported on a short shaft 62 journaled in bracket 32. Each pulley is urged toward gear 56 by a coil spring 64 and is formed with a grooved periphery for a flexible connector such as a Bowden wire 66 passing through the stationary tube 36. It will be noted that the various pulleys 60 to which the Bowden wires are secured radiate from the axis of tubes 18 and 36; i. e., they are arranged in radial planes angularly spaced about said axis. By this novel arrangement of the pulleys, the various flexible connectors such as the Bowden wires pass directly into the tube without any distortion.

The connectors 66 from the spark and throttle control devices pass from the lower end of tube 36 into non-elastic tubes 68 which are capable of being bent into the necessary positions to guide the wires to the throttle and to the device for advancing and retarding the spark, and which are sufficiently rigid to sustain themselves in the positions to which they are bent, so that they serve as guides for the wires.

In the modification shown in Figures 6 to 8 the headlights are controlled by an electrical dimmer switch 30 shown as being of the "wobble" switch type, which has a plurality of contacts to which electrical conductors 70 are attached, these conductors then passing through tube 36 to the lighting circuit.

Figure 5:
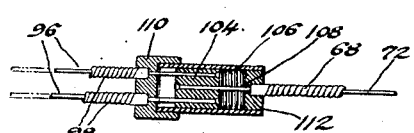
Figure 5 is a longitudinal section through the novel connecting device for the tiltable lamp.

In the modification shown in Figures 1 to 4 the headlights are arranged to be dimmed by mechanical means controlled by a lever 28 operating through connections such as described for the throttle and spark levers to operate a Bowden wire or other flexible connector 72. Each headlight comprises a lens 76 and a casing 74 within which a substantially parabolic reflector 78 is tiltably mounted on horizontal trunnions 80 for angular movement about a transverse horizontal axis. An electric lamp is mounted in the usual manner substantially at the focus of the reflector 78 and is supported by the reflector, current being supplied through electrical conductors 82. The reflector is rocked to its normal position, with its axis substantially horizontal or very slightly downwardly inclined, by means of a spring 84. The reflector is also provided with an arm 86 fixed thereto and passing through a slot in casing 74, the arm being pivoted to a forked member 88 through which passes a connecting bolt 90, on which is adjustably threaded a sleeve 92 locked in adjusted position by a lock nut 94 and perforated to receive a Bowden wire or other flexible connector 96 and to be operated by said wire through a head formed on the wire. Sleeve 92 is mounted for sliding movement in a bushing 98 held by a lock nut 100 and is urged outwardly by coil spring 102 within the bushing and engaging at opposite ends the sleeve 92 and the head of bushing 98. The wires 96 from the two headlights are provided with guide casings 98 such as described above, and are connected to the wire 72 by means of a cross member 104 as shown in Figure 5. Cross member 104 is slidably supported in a tube 106, being urged outwardly by a coil spring 108. The tube is provided with a head 110 to which casings 98 are secured and with a head 112 to which casing 68 for wire 72 is secured.

By the above described arrangement, the reflectors for the headlight will both be tilted against the resistance of springs 84, 102, and 108 by manipulation of the mechan ical switch lever 28, in such a manner as to deflect the major portion of the light down toward the road so that the light is effectively dimmed from the point of view of the driver of an approaching vehicle.

The above described novel arrangements of steering and controlling mechanisms may be regarded as being modified forms of the mechanism shown and claimed in my co-pending application S. N. 544,367, filed March 16, 1922. For certain classes of steering mechanism in which the steering wheel has a considerable angular movement, the above described modifications are advantageous in that no angular movement is imparted to the electrical conductors or to the flexible connectors 66 and 72. Where the range of angular movement is not so great, the arrangement described in my above identified pending application has the advantage of being quite simple and will in many cases be found entirely satisfactory. It is my intention to claim all subject matter common to the two applications in the earlier filed application S. N. 544,367.

While two particular embodiments of my invention have been illustrated and described it is not my intention to limit the scope of the invention to these embodiments or otherwise than by the terms of the appended claims. I claim as novel and desire to protect by U. S. Letters Patent the subject matter defined in the following claims:

I claim:

1. Steering and controlling mechanism comprising, in combination, a steering wheel having a hub, a cover plate supported above the center of said hub, the wheel and plate being constructed and arranged to provide an intermediate space and the wheel being angularly movable without affecting the position of the plate, a set of control devices in the intermediate space, and device-operating members extending exteriorly of the plate.

2. Steering and controlling mechanism comprising, in combination, a steering wheel having a hub, a cover plate supported above the center of said hub, the wheel and plate being constructed and arranged to provide an intermediate space and the wheel being angularly movable without affecting the position of the plate, and control devices supported in said intermediate space.

3. Steering and controlling mechanism comprising, in combination, a steering wheel having a centrally-arranged control-containing casing movable therewith, a cover plate for said casing supported independently of the steering wheel so that it does not move therewith, and control devices supported by the casing.

4. Steering and controlling mechanism comprising, in combination, a steering wheel having a centrally-arranged control-containing casing movable therewith, a cover plate for said casing supported independently of the steering wheel so that it does not move therewith, control devices stationarily supported in the casing, and device-operating members extending exteriorly of the cover plate.

5. Steering and controlling mechanism comprising, in combination, a steering wheel, a stationary supporting member arranged co-axially with respect to said wheel, a supporting bracket clamped to said member above the wheel, and control devices and a cover plate therefor supported by said bracket, the plate cooperating with a portion of the wheel substantially to enclose said devices.

6. Steering and controlling mechanism comprising, in combination, a steering wheel, a steering tube operated thereby, an inner supporting tube within the steering tube, a pulley arranged radially with respect to said tubes, a flexible connection from the pulley passing through the inner tube, an operating device geared to the pulley and angularly movable about an axis substantially parallel to the axis of the tubes, and means arranged to hold said operating device and pulley in any position to which they may be moved by manipulation of the operating device.

7. Controlling mechanism comprising, in combination, a supporting tube, a pulley arranged radially with respect to said tube, a flexible connection from the pulley passing through the tube, an operating device geared to the pulley and angularly movable about an axis substantially parallel to the axis of the tube, and friction means arranged to hold said operating device and pulley in any position to which they may be moved by manipulation of the operating device.

8. In apparatus of the class described, the combination with a steering post; of a steering wheel fixed upon the post at the top thereof and having a central chamber; a stationary supporting tube extending through the post, a frame supported upon said stationary tube and enclosed by the chamber, a plurality of controllers supported by the frame; and a series of connections extending within the stationary tube and connected respectively with said controllers.

9. In apparatus of the class described, the combination with a steering post and wheel mounted thereon, of a stationary tube extending through the post, a controller including a frame mounted on said tube within the rim of said wheel, manually operable devices carried by the frame and extending above the upper side thereof, and connections from the controller extending through the tube, and means movable with the steering post for enclosing the under side of said frame.

10. Controlling apparatus for motor vehicles comprising the combination with a hollow steering post, of a steering wheel having a hollow hub providing a chamber attached to said post, a controller frame providing a cover for said chamber, means for non-rotatably supporting said frame spaced from said hub, and a controlling device supported by said frame and including a connection extending through said post.

11. In a controller for motor vehicles, the combination with a steering post and wheel mounted thereon, of a stationary tube extending through the steering post and endwise adjustable with respect thereto; a controller including a frame mounted on said tube and spaced therefrom, manually operable devices supported thereby, and connections associated with said devices extending into the space between the frame and tube and down into the tube, and means independent of the frame and cooperating therewith to enclose said connections.

12. In a controller for motor vehicles, the combination with a steering post and wheel mounted thereon, of a controller including a frame non-rotatably mounted above said steering post centrally of said wheel and movable axially of said post, manually operable devices supported by said frame, connections associated with said devices extending within said post, and means independent of the frame and cooperating therewith to enclose said connections.

13. In a controller for motor vehicles, the combination with a steering post mounted on a vehicle frame, of a tube passing through said post and having its ends extending beyond the opposite ends of said post, means attached to the vehicle frame and adapted to clamp the end of said tube adjacent the lower end of said post, a controller including a frame non-rotatably mounted upon the end of said tube adjacent the upper end of said post and spaced therefrom, manually operable devices supported thereby, and connections associated with said devices extending into the space between the frame and tube and down into the tube, and means independent of the frame and cooperating therewith to enclose said connections.

14. In apparatus of the class described, the combination with a steering post and wheel mounted thereon, of a stationary tube extending through the post, a controller mounted in a non-rotatable manner on said tube and spaced therefrom, including manually operable devices, and connections associated with said devices exposed between the controller and said tube and extending down into the tube, and means independent of the controller for enclosing said exposed connections between the controller and the tube.

15. In apparatus of the class described, the combination with a steering post and wheel mounted thereon, of a stationary tube extending through the post, a controller including a frame mounted on said tube within the rim of said wheel, manually operable controlling devices, and connections associated with said devices extending down into said tube, and means independent of the controller and movable with the wheel for enclosing said connections between the controller and the tube.

16. In a controller for motor vehicles, the combination with a steering post and wheel mounted thereon, of a stationary tube extending through the steering post, a controller including a frame mounted on said tube and spaced therefrom, manually operable devices supported thereby, and connections associated with said devices extending into the space between the frame and tube and down into the tube, and means independent of the frame and cooperating therewith to enclose said connections.

17. In a controller for motor vehicles, the combination with a steering post and wheel mounted thereon, of a stationary tube extending through the steering post, a controller including a frame non-rotatably mounted on said tube and spaced therefrom, manually operable devices supported thereby, and connections associated with said devices extending into the space between the frame and tube down into the tube, and rotatable means separate from the frame and cooperating therewith to enclose said connections.

18. In a controller for motor vehicles, the combination with a steering post and wheel mounted thereon, of a stationary tube extending through the steering post, a casing comprising movable and stationary parts, said movable part comprising the hub of the steering wheel and said stationary part being mounted on said tube and spaced therefrom, controlling devices supported by said stationary part, and connections associated with said devices extending into the space between the stationary part and tube and down into the tube and enclosed by said movable part.

In testimony whereof I affix my signature.

HARRY M. DENYES.